(12) United States Patent
Kishioka et al.

(10) Patent No.: US 8,094,269 B2
(45) Date of Patent: Jan. 10, 2012

(54) LIQUID CRYSTAL DISPLAY DEVICE, MANUFACTURING METHOD THEREOF, AND COLOR FILTER SUBSTRATE

(75) Inventors: Atsushi Kishioka, Fujisawa (JP); Shinji Sekiguchi, Kawasaki (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 824 days.

(21) Appl. No.: 12/164,189

(22) Filed: Jun. 30, 2008

(65) Prior Publication Data

US 2009/0021675 A1 Jan. 22, 2009

(30) Foreign Application Priority Data

Jul. 19, 2007 (JP) .................................. 2007-188187

(51) Int. Cl.
*G02F 1/1335* (2006.01)
*G02F 1/1339* (2006.01)

(52) U.S. Cl. .......................... 349/114; 349/117; 349/153

(58) Field of Classification Search .................. 349/114, 349/117, 153
See application file for complete search history.

(56) References Cited

U.S. PATENT DOCUMENTS

| 6,281,952 | B1 | 8/2001 | Okamoto et al. | |
|---|---|---|---|---|
| 7,088,409 | B2 | 8/2006 | Itou et al. | |
| 2005/0264731 | A1* | 12/2005 | Itou et al. | 349/114 |
| 2006/0221291 | A1* | 10/2006 | Hong et al. | 349/153 |

FOREIGN PATENT DOCUMENTS

| JP | 11-242226 | 9/1999 |
|---|---|---|
| JP | 2003-241186 | 8/2003 |
| JP | 2005-338256 | 12/2005 |

OTHER PUBLICATIONS

C. Doornkamp et al., Next Generation Mobile LCDs with in-cell Retarders, IDW' 03, pp. 685-688.

* cited by examiner

*Primary Examiner* — Nathanael R Briggs
(74) *Attorney, Agent, or Firm* — Antonelli, Terry, Stout & Kraus, LLP.

(57) ABSTRACT

In a transflective liquid crystal panel having an in-cell retarder, for improving a layer structure of poor adhesion, an alignment film for the retardation layer is not applied to a portion of disposing a sealing material at the main surface of a substrate of the liquid crystal panel in the step of applying the alignment film to the main surface.

13 Claims, 7 Drawing Sheets

LIQUID CRYSTAL DISPLAY DEVICE, MANUFACTURING METHOD THEREOF, AND COLOR FILTER SUBSTRATE

The present application claims priority from Japanese application JP 2007-188187 filed on Jul. 19, 2007, the content of which is hereby incorporated by reference into this application.

BACKGROUND OF THE INVENTION

1. Field of the Invention

The present invention concerns a liquid crystal display device having an in-cell retarder and a manufacturing method thereof.

2. Description of the Related Art

At present, transmissive liquid crystal display devices with a wide view angle of an IPS (In Plane Switching) system and VA (Vertical Alignment) system have been popularized as monitors for various equipment and also used for televisions while improving response characteristics. On the other hand, liquid crystal display devices have also been popularized in mobile information equipment including cell-phones and digital cameras. Recently, for the mobile information equipment, models having an angle-variable display have been increased and a wide view angle is demanded since they are often observed from an oblique direction.

Since display devices for use in the mobile information equipment are used in various circumstances including from outdoors in fine weather to dark rooms, it is desired that the devices are transflective. A transflective liquid crystal display device has a reflective display area and a transmissive display area in one pixel.

The reflective display area reflects a light incident from the periphery by using a reflection plate to conduct display and, since a contrast ratio thereof is constant irrespective of the surrounding brightness, favorable display can be obtained in a relatively bright circumstance including from outdoors in fine weather to the inside of rooms. On the other hand, since the transmissive display area provides a constant luminance by using a backlight irrespective of the circumstance, a display at a high contrast ratio is obtained in a relatively dark circumstance from the indoor to the dark room. The transreflective liquid crystal display device having both of the characteristics can provide display at a high contrast ratio in a wide range of circumstances including from the outdoors in fine weather to the dark room.

Heretofore, it has been expected that reflective display and transmissive display with a wide view angle can be obtained together by making the IPS system which is known to provide a transmissive display with a wide view angle into a transflective. For example, Japanese Unexamined Patent Application Publication No. Hei 11 (1999)-242226 and its counterpart U.S. Pat. No. 6,281,952 describe a transflective IPS system.

In the transflective IPS system liquid crystal display device, a retardation plates are disposed to the entire outer surface on upper and lower sides of a liquid crystal panel, in which a liquid crystal layer is sealed between two transparent substrates but the retardation plate has view angle dependency. Accordingly, even when the phase difference between the liquid crystal layer and a plurality of retardation plate is optimized in the normal direction of the liquid crystal layer, the phase difference deviates suddenly from the optimal conditions for dark display as apart from the normal direction.

Further, the structure for the arrangement and the display characteristic in a case where a retardation plate (retardation layer) is incorporated to the inside of a panel instead of an externally added retardation plate are disclosed by C. Doornkamp et al., in Philips Research, "Next generation mobile LCDs with in-cell retarders" International Display Workshops 2003, p 685 (2003). Further, Japanese Unexamined Patent Application Publication No. 2005-338256 and its counterpart U.S. Pat. No. 7,088,409 disclose a consideration for making the transflective IPS system having an in-cell retarder so as to provide a wide view angle equivalent with that of the entire transmissive IPS system.

Since the in-cell retarder includes a liquid crystal polymer, alignment of molecules is higher compared with an existent external retardation plate manufactured by stretching an organic polymeric film. Further, Δn of the in-cell retarder is much greater than that of the external retardation plate. Further, while the layer thickness is as large as several tens μm in the case of the external retardation plate, the layer thickness can be greatly decreased to several μm when the in-cell retarder is formed by using the liquid crystal polymer.

SUMMARY OF THE INVENTION

A transflective liquid crystal panel having an in-cell retarder uses a color filter having an in-cell retarder. The color filer requires an alignment film for a retardation layer for aligning the retardation layer. For example, in a usual color filter of a transflective IPS system liquid crystal panel having an in-cell retarder, sub-color, pixels such as for red, green, and blue, a leveling film, an alignment film for the retardation layer, a retardation layer, and a protection layer for the retardation layer are laminated in this order on a transparent substrate at a portion corresponding to a reflective display section. Further, in a color filter substrate at a portion of disposing a sealing material used for adhering the color filter substrate and a thin film transistor (TFT) substrate, a black matrix, a leveling film, an alignment film for a retardation layer, and a protection layer for the retardation layer are laminated in this order above a transparent substrate.

Generally, a polyimide type polymer is used for the alignment film for the retardation layer, and an acrylic polymer, an epoxy type polymer, or an acrylic and epoxy type mixed polymer is used for a leveling film and a protection layer for the retardation layer. The solubility parameter is about 14 $(cal/cm^3)^{1/2}$ for the polyimide type polymer, about 10 $(cal/cm^3)^{1/2}$ for the acrylic polymer, and about 11 $(cal/cm^3)^{1/2}$ for the epoxy type polymer. For the solubility parameter used herein, values determined by calculation are used (R. F. Fedors. Polymer Engineering and Science, vol. 14, p. 147, 1974). As described above, the solubility parameter of the acrylic polymer and the epoxy type polymer is greatly different from the polyimide type polymer and, when both of the films are laminated, adhesion at the boundary thereof is generally poor. That is, in the color filter substrate of a liquid crystal panel having an in-cell retarder, a boundary between the leveling film and the alignment film for the retardation layer and a boundary between the alignment film for the retardation layer and the protection layer for the retardation layer of poor adhesion are present at a portion of disposing the sealing material for adhesion with the TFT substrate. In contrast, in an entire transmissive type liquid crystal panel, since the sealing material is disposed on the leveling film, a layer structure of poor adhesion is not present in the portion for disposing the sealing material. As described above, in the transflective liquid crystal panel having in-cell retarder, since the layer boundary of poor adhesion compared with the entire transmissive liquid crystal panel is present in the portion of disposing the sealing material of the color filter substrate, it involves a problem in view of the strength of the panel and peeling sometimes occurs at the layer boundary of poor adhesion at the portion of disposing the sealing material when an external force is applied to the panel.

In view of the above, the present invention intends to improve the layer structure having the problem described above by a structural countermeasure and provide a liquid crystal display device having an in-cell retarder with improved panel strength.

The invention provides a transflective liquid crystal panel having an in-cell retarder and provided with a color filter structure having an in-cell retarder not forming an alignment film for the retardation layer at a portion of disposing a sealing material.

For example, the invention provides a liquid crystal display device having liquid crystals put between a first substrate and a second substrate, and having a reflective display section for conducting display by a reflection light and a transmissive display section for conducting display by a transmission light. Then, at a position corresponding to the reflective display section of the first substrate, a first protection layer, an alignment film for a retardation layer, a retardation layer, and a second protection layer are laminated in this order. On the other hand, the first protection layer and the second protection layer are laminated in this order at a seal portion at the outer peripheral edge of a display region.

That is, in the liquid crystal display device described above, a retardation layer is formed to the first substrate at a position corresponding to the reflective display section at the surface on the side of liquid crystals, and a region not formed with the alignment film for the retardation layer is disposed to the first substrate at a seal portion for the outer peripheral edge of the display region at the surface on the side of the liquid crystals.

Further, the present invention provides a method of manufacturing a liquid crystal display device having a liquid crystal layer sandwiched in an opposing gap between a first substrate and a second substrate, in which the first substrate and the second substrate are sealed at the outer peripheral edge of the display region thereof by a sealing material, the display region includes a matrix arrangement of a plurality of pixels, and having a reflective display section and a transmissive display section on every pixel. Then, the method includes a step of forming an alignment film for a retardation layer of the main surface of the first substrate within the surface of the substrate at least excepting for a portion of disposing the sealing material, a step of providing the alignment film for the retardation layer with an alignment control function, a step of applying an optical retardation material for applying the optical retardation material covering the alignment film for the retardation layer, and an exposure step of selectively exposing and curing a portion of the optical retardation material corresponding to the reflective display section.

Further, the invention provides a color filter substrate of a liquid crystal display device having a reflective display section and a transmissive display section. Then, at a position corresponding to the reflective display section, a first protection layer, an alignment film for a retardation layer, a retardation layer, and a second protection layer are laminated in this order. On the other hand, the display region includes at a position corresponding to the seal portion at the outer peripheral edge thereof a region where the first protection layer and the second protection layer are stacked in this order.

That is, the color filter substrate is provided with a retardation layer at a position corresponding to the reflective display section at the surface on the side of the liquid crystals and a region not formed with the alignment film for the retardation layer to a seal portion for the outer peripheral edge of the display region at the surface on the side of the liquid crystals.

According to the invention, in the transflective liquid crystal panel having the in-cell retarder, the lamination structure for the portion of disposing the sealing material is improved, and the strength of the transflective liquid crystal panel having the in-cell retarder is improved irrespective of the liquid crystal driving system such as the IPS system or the VA system.

DETAILED DESCRIPTION

The present invention is to be described by way of preferred embodiments with reference to the drawings.

Figure 1:
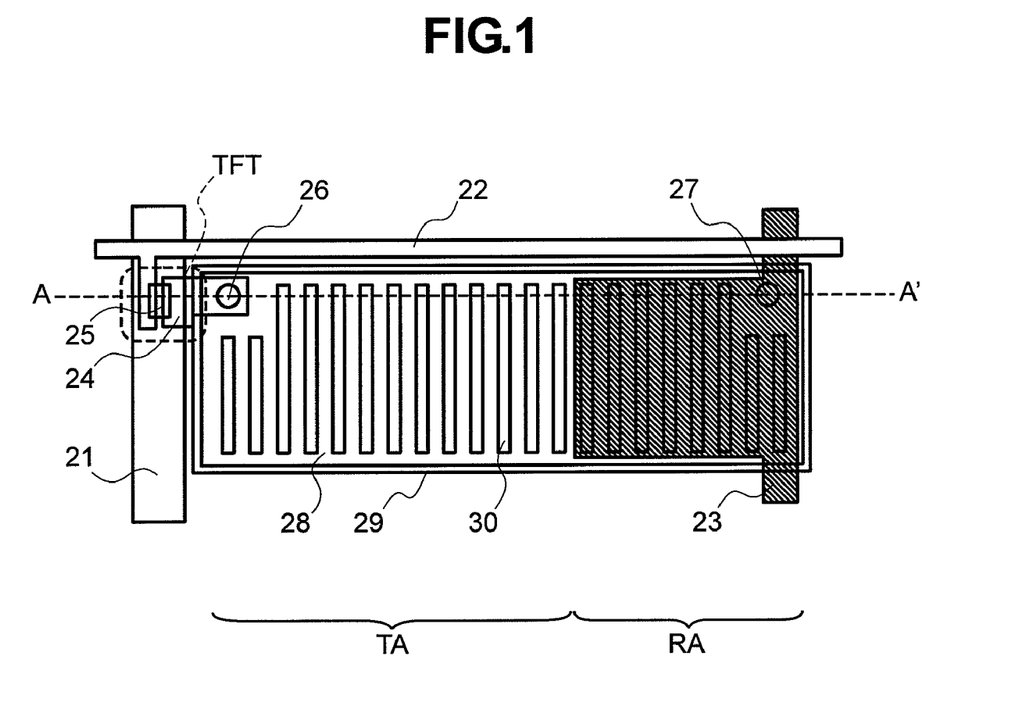
FIG. 1 is a plan view for explaining a schematic constitutional example of 1 pixel of a liquid crystal panel constructing a liquid crystal display device according to the invention.
Figure 2:
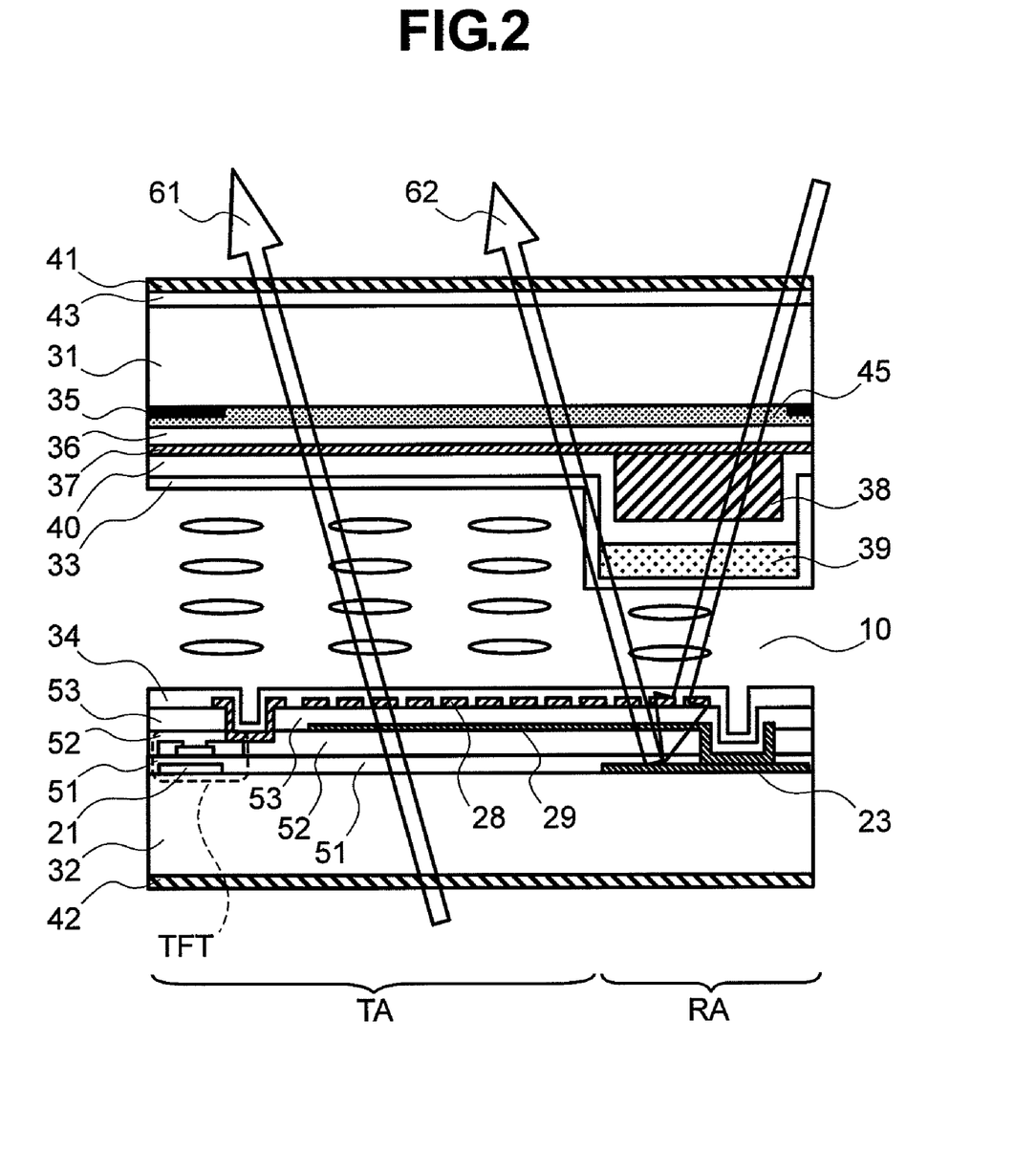
FIG. 2 is a cross sectional view along line A-A' in FIG. 1 for explaining a schematic constitutional example of 1 pixel of a liquid crystal panel constructing a liquid crystal display device according to the invention.

FIG. 1 is a plan view for explaining a constitutional example of 1-pixel of a liquid crystal panel constructing a liquid crystal display device applied with a first embodiment of the invention. FIG. 2 is a cross sectional view taken along line A-A' in FIG. 1 for explaining the schematic constitutional example of 1-pixel of the liquid crystal panel shown in FIG. 1.

A liquid crystal panel includes a first substrate 31, a liquid crystal layer 10, and a second substrate 32, in which the liquid crystal layer 10 is sandwiched in an opposing gap between the first substrate 31 and the second substrate 32.

On the main surface (inner surface) of the first substrate 31 are laminated a color filter 45 partitioned by a black matrix 35, a leveling layer (first protective film) 36, an alignment film 37 for a retardation layer) an in-cell retarder (hereinafter simply referred to as a retardation layer) 38, a protection layer (second protection film) 40 for the retardation layer 38, and a first alignment film 33 in this order.

The retardation layer 38 is disposed only to a reflective display area RA, and is not disposed to a transmissive display area TA.

The alignment film 37 for the retardation layer is provided with an alignment control function of controlling the alignment of a material that forms the retardation layer 38 including a liquid crystal layer composition. Further, the first alignment film 33 is provided with an alignment control function of controlling the initial alignment of the liquid crystal layer 10 for display light control.

The main surface of the second substrate 32 has a thin film transistor TFT for driving the pixel. The thin film transistor TFT is connected to a scanning interconnection 21, a signal interconnection 22, and a pixel electrode 28.

In addition, the thin film transistor has a common interconnection 23 and a common electrode 29. The thin film transistor TFT has a reverse staggered structure in which a channel part is formed of an amorphous silicon (a-Si) layer 25. The scanning interconnection 21 and a source drain electrode 24 are insulated by a first insulation layer 51. A second insulation layer 52 is present above the thin film transistor TFT.

The scanning interconnection 21 and the signal interconnection 22 intersect in the row direction and the column direction to form a 2-dimensional matrix. The thin film transistor TFT is situated generally near the intersection thereof.

The common interconnection 23 is disposed in parallel with the scanning interconnection 21 and connected by way of a second through hole 27 to the common electrode 29. The pixel electrode 28 and the source drain electrode 24 of the thin film transistor TFT are joined by way of a first through hole 26. A second alignment film 34 is present above the pixel electrode 28 and provided with an alignment control function of controlling the initial alignment of the liquid crystal layer 10.

The first substrate 31 is preferably formed of borosilicate glass with less ionic impurities and the thickness thereof is, for example, 0.5 mm. In the color filter 45 partitioned by the black matrix 35, each of portions showing red, green and blue (color sub-pixels) is repetitively arranged in a stripe manner and each of the stripes is in parallel with the signal electrode 22. Crenelation on the surface of forming the black matrix 35 and the color filter 45 is leveled by a leveling layer (first protection film, overcoat film) 36 made of resin. The first alignment film 33 is an organic polyimide film, and applied with an aligning treatment by a rubbing method.

For the second substrate 32, borosilicate glass like that for the first substrate 31 is suitable and the thickness is, for example, 0.5 mm. The second alignment film 34 is an organic polyimide film having a horizontally aligning property like the first alignment film 33. The signal interconnection 22, the scanning interconnection 21, and the common interconnection 23 are formed, for example, of aluminum, (Al) or an alloy thereof (aluminum and neodium alloy: Al—Nd), or chromium (Cr). The pixel electrode 28 is preferably formed of a transparent conductive film such as of indium tin oxide (ITO) and the common electrode 29 is also formed preferably of a transparent conductive film such as of ITO.

The pixel electrode 28 has slits 30 parallel with the scanning interconnection 21 and the pitch between the slits 30 is about 4 μm. The pixel electrode 28 and the common electrode 29 are spaced by a third insulation layer 53 of 0.5 μm in thickness and an electric field is formed between the pixel electrode 28 and the common electrode 29 upon application of voltage. The electric field is deformed into an arc-shape by the effect of the third insulation layer 53 and passes through the liquid crystal layer 10. This changes alignment of the liquid crystal layer 10 upon application of voltage. Numerical values described above also including other numerical values in the specification and the drawings are shown only as examples and the invention is not restricted to the numerical values.

The common interconnection 23 has a structure extending into the pixel electrode 28 in the area crossing the pixel electrode 28. In FIG. 1, an area where the common interconnection 23 and the pixel electrode 28 overlap is a reflective display area RA and reflects light as shown by a reflection light 62. Other overlapped area between the pixel electrode 28 and the common electrode 29 than described above allows the light of a backlight to transmit therethrough to form a transmissive display area TA as shown by a transmission light 61. Since the optimal layer thickness of the liquid crystal layer is different between the transmissive display area TA and the reflective display area RA, a step is formed at the boundary. For shortening the boundary between the transmissive display area TA and the reflective display area RA, the transmissive display area TA and the reflective display area RA are arranged such that the boundary is in parallel with the shorter side of the pixel.

As described above, by using the interconnection such as the common interconnection 23 in common with the reflection plate, an effect of decreasing the manufacturing steps can be obtained. When the common interconnection 23 is formed of aluminum or the like of high reflectance, brighter reflective display is obtained. The same effect is obtained also by forming the common interconnection 23 with chromium and separately forming a reflection plate of aluminum or a silver alloy.

The liquid crystal layer 10 includes a liquid crystal layer composition that shows a positive dielectric constant anisotropy in which the dielectric constant in the aligning direction is greater than that in the normal direction. In this case, the composition has a birefringence of 0.067 at 25° C. and shows a nematic phase in a wide temperature range including a room temperature region. Further, the liquid crystal layer shows a high resistance value not causing flicker while sufficiently maintaining reflectance and transmittance during holding period when driven at a frequency of 60 Hz by using the thin film transistor.

The liquid crystal display device of this embodiment is generally constructed as described above and it has a characteristic feature in the layer structure of the main surface of the first substrate in a seal portion (portion of disposing a sealing material) for adhering the first substrate 31 and the second substrate 32.

Figure 3:
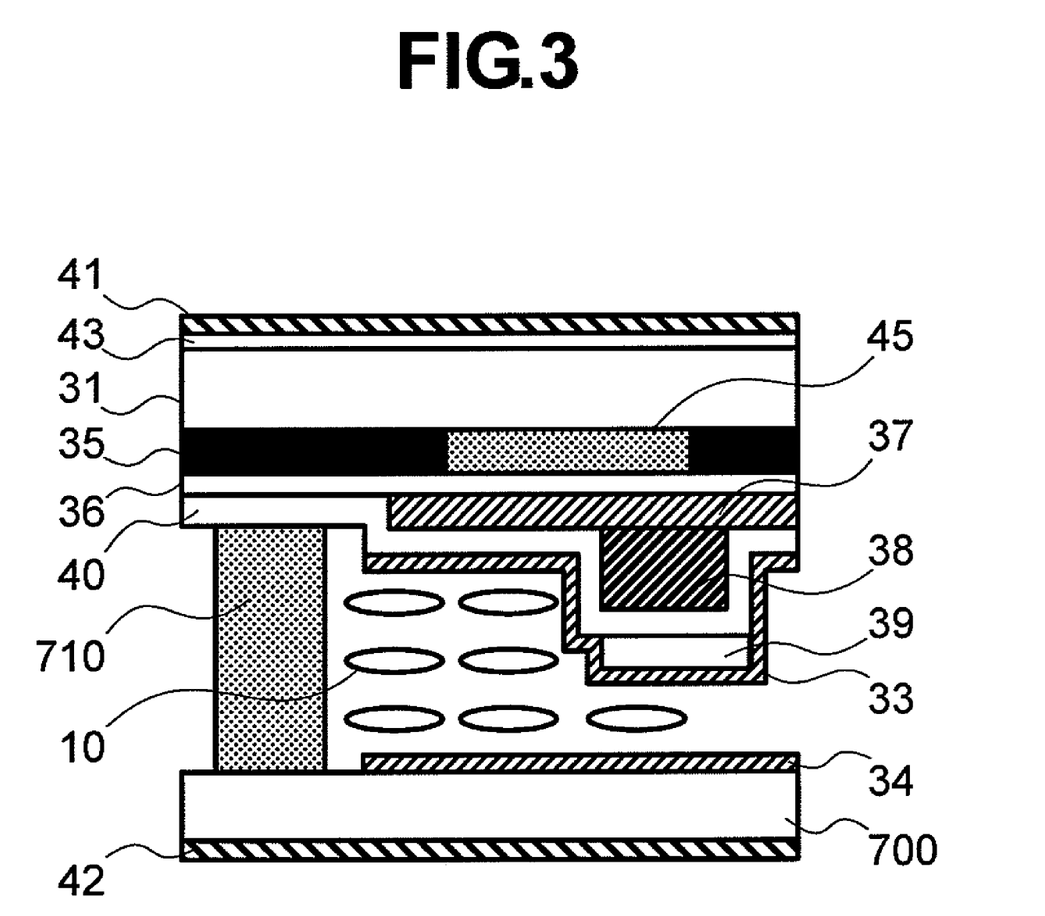
FIG. 3 is a cross sectional view for explaining a schematic constitutional example for a portion of disposing a sealing material.

FIG. 3 is a cross sectional view for a portion of disposing a sealing material of a liquid crystal panel. Scanning interconnection, signal interconnection, common interconnection, pixel electrode, common electrode, etc. fabricated above the second substrate are not illustrated and they are shown as a TFT substrate 700.

In the layer structure for the portion of disposing the sealing material 710 formed above the first substrate 31, a first protection film 36 and a second protection film 40 are laminated in this order above a black matrix 35 (on the side of a liquid crystal 10). That is, an alignment film 37 for a retardation layer of poor adhesion is not present to a portion for disposing the sealing material 710 and the layer boundary of the protection film is not present. The first protection film 36 and the second protection film include an identical or similar composition and can be bonded firmly. With such a structure, sealing reliability for the entire frame-like seal portion is improved.

Figure 4:
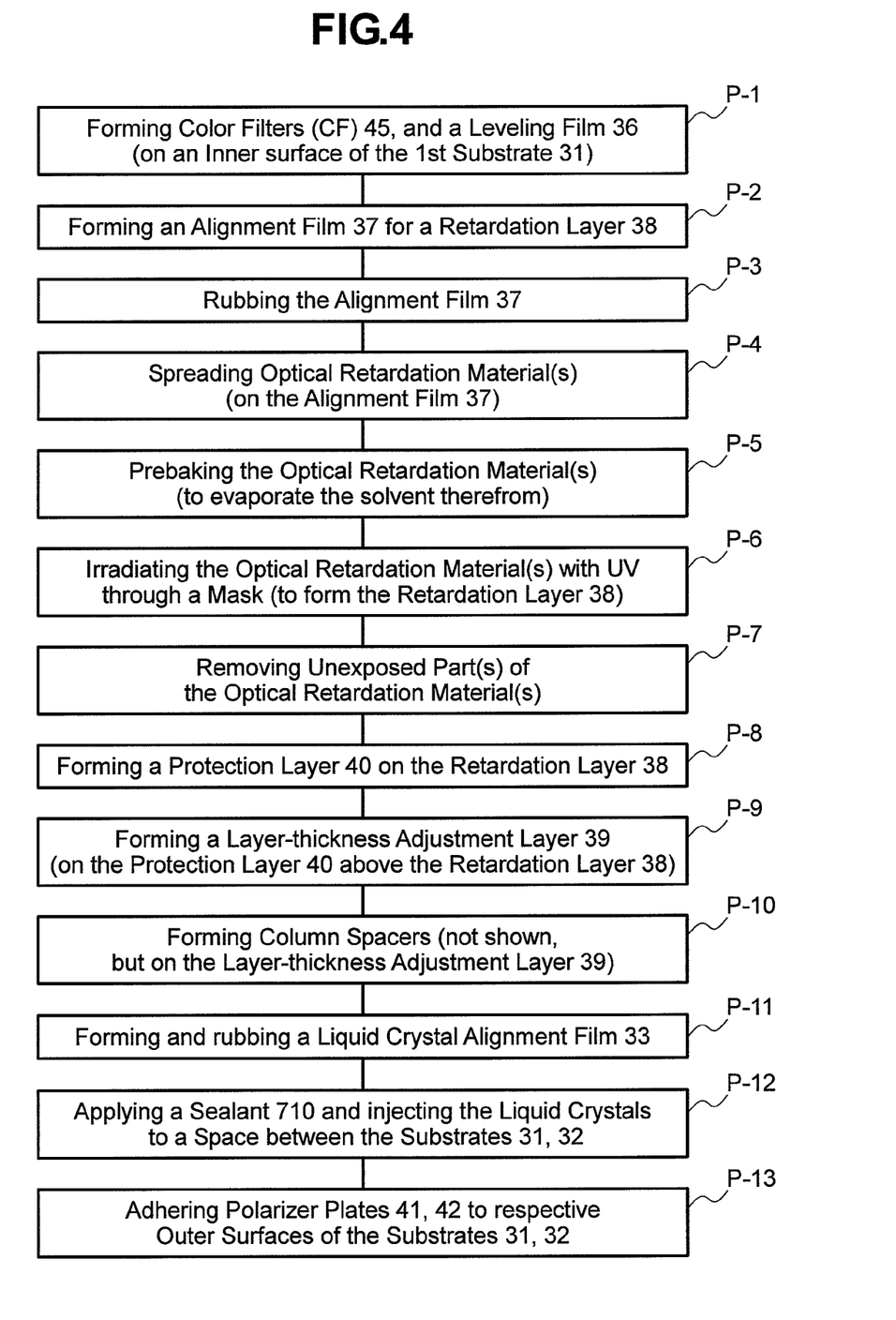
FIG. 4 is an explanatory view for a process of manufacturing a liquid crystal panel constructing a liquid crystal display device according to the invention.
Figure 5:
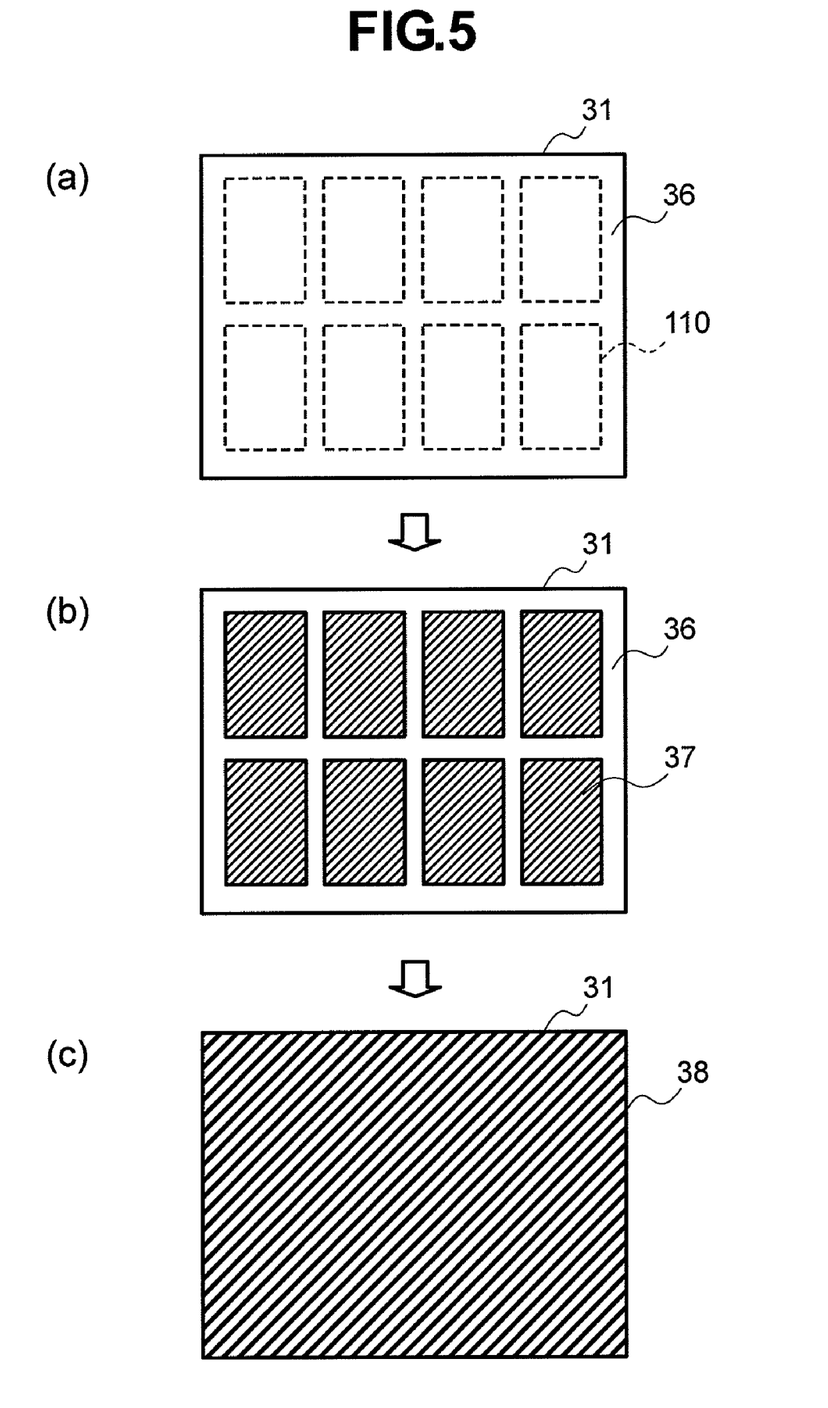
FIGS. 5A and 5B are upper plan views of a first substrate in the manufacturing process.
Figure 6:
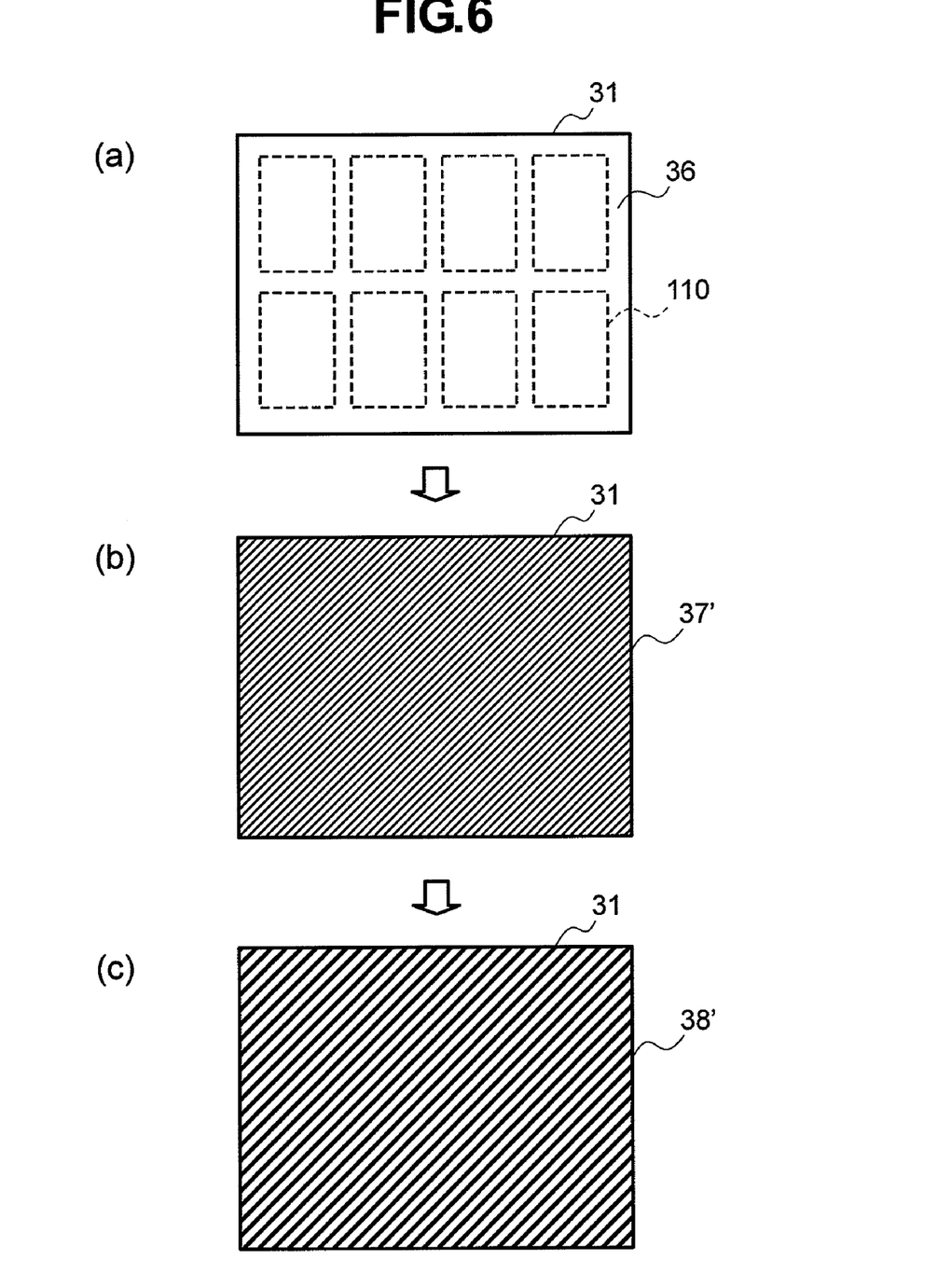
FIGS. 6A and 6B are upper plan views of a first substrate in the manufacturing process of one example of a liquid crystal panel to be compared with the invention.

FIG. 4 is an explanatory view for the process of manufacturing a liquid crystal panel constructing a liquid crystal display device of this embodiment. Further, FIGS. 5A and 5B are upper plan views showing the state of the first substrate 31 after the process P-1 in FIG. 4. For comparison, FIGS. 6A and 6B are upper plan views showing the state of the first substrate 31 after the process P-1 in the existent method.

At first, the black matrix 35 and the color filter 45 are formed on the main surface of the first substrate 31 and the surface thereof is covered with the first protection film 36 including the acrylic and epoxy type mixed polymer to level the surface (P-1).

At the completion of the process P-1, as shown in FIG. 5A, a matrix arrangement of a color filter is formed to the first substrate 31 at 8 areas of effective display regions 110 respectively. Then, the first protection film 36 is applied at the uppermost layer over the entire surface of the first substrate 31.

Then, as shown in FIG. 5B, an alignment film 37 for a retardation layer is applied to the effective display regions 110 imposed to the first substrate 31 by flexographic printing (P-2).

An alignment film 37' for a retardation layer of good wettability was formed so far to the entire surface of the first substrate 31 as shown in FIG. 6B for uniformly applying the optical retardation material in the subsequent step. On the other hand, in this embodiment, as shown in FIG. 5B, the alignment film 37 for the retardation layer is applied conforming to the imposition of the effective display regions 110 while keeping off the position of disposing the sealing material at the outside of the effective display regions 110. Thus, as shown in the cross sectional view of FIG. 3, the alignment film 37 for the retardation layer is not formed to the layer structure corresponding to the position of disposing the sealing material 710.

In this embodiment, as shown in FIG. 5B, the alignment film 37 for the retardation layer is applied conforming to the imposition of the effective display regions 110 but the effect of the invention can be attained by not forming the alignment film 37 for the retardation layer to a position for disposing the sealing material for adhering the first substrate and the second substrate and the alignment film 37 for the retardation layer may be applied also to other portion than that the sealing material is disposed in addition to the effective display regions 110. Further, while flexographic printing is used as a method of applying the alignment film 37 for the retardation layer in this embodiment, other applying method such as ink jet may also be used.

Then, after baking the alignment film 37 for the retardation layer, it is rubbed to provide an alignment control function (P-3). The alignment film 37 for the retardation layer has a horizontal aligning property and has a function of determining direction of the retardation axis of the retardation layer 38. Then, an optical retardation material is applied on the alignment film 37 for the retardation layer (P-4).

The optical retardation material used herein is an organic material formed by dissolving a nematic liquid crystal monomer having a photoreactive acrylic group (acrylate) at the terminal end of molecule and a polymerization initiator (reaction initiator) in an organic solvent and, to which an additive is further added for improving the wettability.

Examples of the nematic liquid crystals monomer having the photoreactive acrylic group (acrylate) at the terminal ends of the molecule are shown below.

[chemical formula 1]

-continued

[chemical formula 2]

Further, the polymerization initiator is not particularly restricted so long as it starts polymerizing reaction and includes commercial products, for example, IRGACURE 651, IRGACURE 184, DAROCUR 1173, IRGACURE 500, IRGACURE 2959, IRGACURE 127, IRGACURE 907, IRGACURE 1300, IRGACURE 369, IRGACURE 379, IRGACURE 1800, IRGACURE 1870, IRGACURE 4265, DAROCUR TPO, IRGACURE 819, IRGACURE 819DDW, IRGACURE 784, IRGACURE OXE 01, IRGACURE OXE 02, and IRGACURE 754, manufactured by Ciba Specialty Chemicals (Basel, Switzerland).

Further, the organic solvent for the optical retardation material includes, for example, propylene glycol monomethyl ether acetate, cyclohexanone, ethylene glycol monomethyl ether acetate, diethylene glycol monobutyl ether acetate, diethylene glycol monoethyl ether acetate, methoxybutyl acetate, diethylene glycol dimethyl ether, and diethylene glycol methylethyl ether.

As described above, an additive for improving the wettability is contained in the optical retardation material. This is due to the following reason.

In this embodiment, the alignment film 37 for the retardation layer is not formed at a position of disposing the sealing material. That is, the first protection film 36 is exposed. Even when it is intended to apply the existent optical retardation material (that is, optical retardation material formed by dissolving only the nematic liquid crystal monomer having the photoreactive acrylic group (acrylate) on the terminal end of molecule and the polymerization initiator in the organic solvent) on such a layer, since the wettability to the first protection film 36 is poor, uniform applying is difficult.

For example, when a liquid droplet of pure water with a specific resistivity of 10 MΩcm or higher is brought into contact therewith and a contact angle after 30 sec is measured, it is about 30° for the polyimide type polymer and 70° for the acrylic and epoxy type mixed polymer (V-259 PHE manufactured by Nippon Steel Chemical Co., Ltd. (Tokyo, Japan)) of the IPS alignment film. Further, when the contact angle was measured by using an optical retardation material (Paliocolor, manufactured by BASF SE (Societas Europaea) (Ludwigshafen, Germany), 30 wt % LC 242, 3 wt % polymerization initiator, 70 wt % propylene glycol monomethyl ether acetate), it was excessively spread under wetting to the polyimide type polymer of an IPS alignment film and the contact angle could not be measured, and the contact angle is as high as about 24° to the acrylic and epoxy type mixed polymer (V-259 PHE manufactured by Nippon Steel Chemical Co., Ltd. (Tokyo, Japan)) and the wettability was poor. When the optical retardation material is actually applied to respective polymer films, it can be applied uniformly on the polyimide type polymer but cannot be applied uniformly on the acrylic and epoxy type mixed polymer causing repellency thereon.

Accordingly, it is optimal to add such an additive as capable of lowering the surface tension such that the contact angle of the optical retardation material is 200 or less relative to the polymer film with the contact angle of 65° or more when measured for the contact angle after 30 sec by contacting a liquid droplet of pure water with a specific resistivity of 10 MΩcm or higher. In a case of using the optical retardation material adjusted for the wettability, the optical retardation material can be applied uniformly on both of the first protection film 36 and the alignment film 37 for the retardation layer.

Such additive includes, for example, acrylic additives, silicon type additives, and fluoric additives described below. Some of such additives are sometimes referred to as surfactants.

(1) Acrylic Additive:

[chemical formula 3]

$R^1 = $—H
—$CH_3$
$R^2, R^3, R^4 = $ alkyl, polyester, polyether, amine salt
x, y, z = integer of 0 to 200

(2) Silicon Type Additives

[chemical formula 4]

$R = $ —$CH_3$ or —$CH_2CH_3$
$X = $ alkyl, vinyl, epoxy, amino, methacryl, mercapto, etc.

[chemical formula 5]

$R = $ alkyl $R = $ alkyl
$R^1 = $ —H or —$CH_3$, $R = $ alkyl
$R^1 = $ aralkyl, polyester

$R = $ alkyl
$R^1 = $ aralkyl, polyester
$R^2 = $ reactive group(—OH, -Acryl etc.)

$R = $ alkyl
$R^1 = $ polyester, polyether m, x, y, z = integer of 0 to 200

(3) Fluoric Additive

[chemical formula 6]

$R_1$=alkyl, alkoxy, etc.
n=integer of 0 to 100

Commercial acrylic additive includes, for example, BYK-340, BYK-352, BYK-354, BYK-355, BYK-356, BYK-358N, BYK-359, BYK-361 N, BYK-380N, BYK-381, BYK-390, and BYK-392, manufactured by BYK-Chemie Japan (Osaka, Japan).

Silicone type additives such as silane coupling agents or siloxane type improve the wettability to the first protection film 36 more efficiently than the acrylic additives.

Commercial silane coupling agents include, for example, KA-1003, KBM-1003, KBE-1003, KBM-303, KBM-403, KBE-402, KBE-403, KBM-1403, KBM-502, KBM-503, KBE-502, KBE-503, KBM-5103, KBM-602, KBM-603, KBE-603, KBM-903, KBE-903, KBE-9103, KBM-573, KBM-575, KBM-6123, KBE-585, KBM-703, KBM-802, KBM-803, KBE-846, and KBE-9007, manufactured by Shin-Etsu Chemical Co., Ltd., Silicone Division (Tokyo, Japan).

Further, commercial siloxane type additives include, for example, BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-344, BYK-370, BYK-375, BYK-377, and BYK-UV3510, manufactured by BYK-Chemie Japan (Osaka, Japan).

Further, other silicone type additives include, for example, EBECRYL 350 and EBECRYL 1360, manufactured by DAICEL-CYTEC Company Ltd. (Tokyo, Japan), and Flow 425, Glide 100, Glide 410, Glide 420, Glide 435, Glide A115, and Glide ZG400, manufactured by Evonik Tego Chemie GmbH, (Essen, Germany).

Further, commercial fluoric additives include, for example, Megaface F-443, F-444, F-445, F-446, F-470, R-08, F-471, F-472SF, F-474, F-475, R-30, R-477, F-478, F-479, F-480SF, F-482, F-483, F-484, F-486, F-487, F-489, F-172D, F-178K, F-178RM, ESM-1, MCF-350SF, BL-20, R-61, and R-90, manufactured by Dainippon Ink and Chemicals, Incorporated (Tokyo, Japan), fluoric surfactants such as Ftergent 250, Ftergent 251, Ftergent 222F, and FTX-218 manufactured by NEOS Company Limited (Kobe, Japan), and Novec FC-4430, manufactured by 3M Company (Maplewood, Mn., USA).

When the additives described above are added in a great amount, lowering of retardation photocurability, patterning property and heat resistance may possibly occur remarkably. Accordingly, the addition amount of the additive to the nematic liquid crystal monomer having the photoreactive acrylic group (acrylate) on the terminal ends of molecule as the solidifying ingredient of the optical retardation material is 0.2% by weight or less (for example, in a range from 0.001 to 0.2% by weight).

Explanation is to be made referring again to FIG. 4. After applying the optical retardation material, it is prebaked for 2 to 3 min by a hot plate at 100° C. to remove the solvent (P-5). This forms a transparent film. The film is aligned directing to the direction of the aligning treatment for the alignment film 37 for the retardation layer at the time of prebaking, and provided with a function as the retardation layer.

Then, for the prebaked optical retardation material, a UV light is irradiated to a portion corresponding to the reflective display section by using an exposure mask having an opening corresponding to the pattern of the retardation layer to photopolymerize and cure the acrylic groups to form the retardation layer 38 (P-6). By the mask exposure, the acrylate corresponding to the opening of the exposure mask is polymerized into a film insoluble to an organic solvent. In this case, the solution concentration and the application condition during application are properly adjusted to control the film thickness such that the retardation of the retardation layer 38 is at ½ wavelength for the wavelength of 550 nm.

Then, development is conducted by an organic solvent and an unexposed part is removed (P-7).

In this embodiment, development is conducted for the uncured portion by the organic solvent. However, this is not restrictive. The uncured retardation layer corresponding to the not-open area of the exposure mask may be formed to an isotropic layer by heating the entire first substrate to a nematic-isotropic phase transition temperature or higher of the nematic liquid crystal having the acrylate on the terminal end of the molecule without conducting development. Then, the uncured acrylic group positioned to the not-open area of the exposure mask may be photopolymerized and cured in the state of the isotropic layer as it is to form a transparent layer by lamp exposure for the entire surface in a heated state of maintaining the isotropic layer.

Then, a transparent organic layer is applied on the retardation layer 38 to form a second protection film 40 (P-8).

In a case of using a retardation layer 38 having Δn twice or more than that of the liquid crystal layer, the thickness becomes insufficient when retardation of the retardation layer 38 is set to ½ wavelength. Then, the difference of retardation between the reflective display section RA and the transmissive display section TA is decreased to less than ¼ wavelength only by the retardation layer 38. In view of the above, for ensuring retardation difference of ¼ wavelength between the reflective display area RA and the transmissive display area TA, a layer thickness adjustment layer 39 is formed on the retardation layer 38.

Specifically, a photosensitive transparent resist is applied to the second protection film 40 and UV-exposure is applied by using an exposure mask. In this case, patterning is conducted by using an exposure mask that provides the same distribution as in the reflective display area RA. Then, the layer thickness adjustment layer 39 is formed by alkali development only above the retardation layer 38 (P-9). A column spacer is formed further thereabove for keeping a gap of the liquid crystal layer (P-10).

Then, a first liquid crystal alignment film 33 is applied to the uppermost layer on the main surface of the first substrate 31, a second liquid crystal alignment film 34 is applied to the uppermost layer on the main surface of the second substrate 32, and a rubbing treatment is applied at a predetermined angle (P-11). Then, column spacers are interposed to the display region between the first substrate 31 and the second substrate 32, and a sealing material is applied in a rectangular frame shape to the inner side of the outer peripheral edge, both of the substrates are assembled by adhering, and the liquid crystal layer 10 is sealed to the inside (P-12).

Finally, a first polarizer plate 41 and a second polarizer plate 42 are disposed to the outside of the first substrate 31 and the second substrate 32 respectively. The transmission axes for the first polarizer plate 41 and the second polarizer plate 42 are arranged such that they are in perpendicular and parallel to the alignment direction of the liquid crystal layer, respectively (P-13).

In this embodiment, a light diffusing pressure sensitive adhesive layer 43 formed by mixing a number of transparent fine spheres having a refractive index different from the pressure sensitive adhesive material was used for the pressure sensitive adhesive layer 43 of the first polarizer plate 41. The constitution described above has an effect of enlarging the optical path of an incident light by utilizing the effect of refraction at the boundary between the pressure sensitive adhesive material and the fine spheres due to the difference of the refractive index between both of them. This can decrease iridescent coloration caused by the interference of reflection light in the pixel electrode 28 and the common electrode 29. However, it will be apparent that the pressure sensitive adhesive layer 43 is not restricted to such a constitution but a pressure sensitive adhesive material having no fine spheres can also be used.

In the transmissive display area TA of the liquid crystal panel manufactured as described above, the transmission axis of the first polarizer plate 41 and the transmission axis of the second polarizer plate 42 are in perpendicular and the latter is in parallel to the liquid crystal aligning direction. Since this is the same constitution as in the transmissive IPS system, a wide view angle usable for the monitor application use can be obtained for the transmissive display in the same manner as in the transmissive ISP system.

Further, the cross sectional area for the seal portion of the liquid crystal panel manufactured by the process described above is as shown in FIG. 3 described above. For comparison, FIG. 7 shows a cross sectional view for the seal portion of a liquid crystal panel manufactured by the existent method (method of applying the alignment film 37' for the retardation layer over the entire substrate as shown in FIGS. 6A and 6B).

Figure 7:
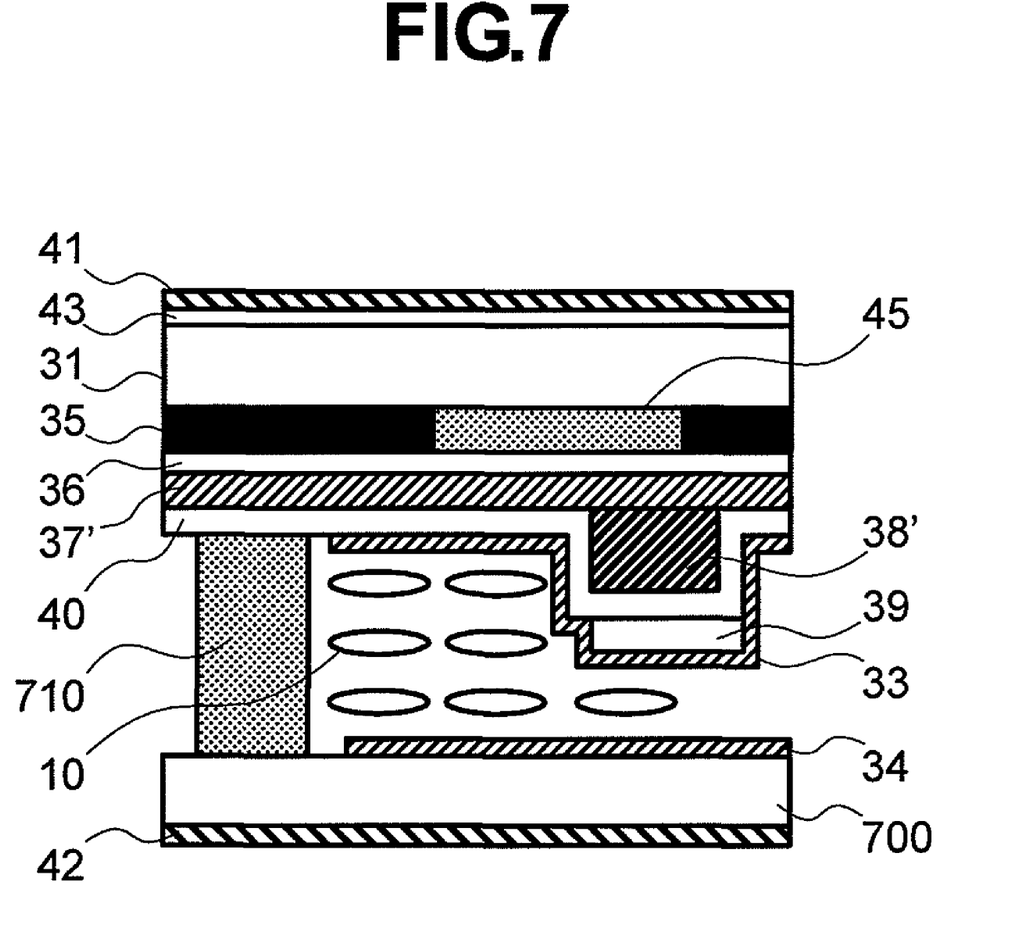
FIG. 7 is a cross sectional view for explaining a schematic constitutional example for a portion of disposing a sealing material in one example of a liquid crystal panel to be compared with the invention.

In the layer structure for the portion of disposing the sealing material 710 formed above the first substrate 31 in the existent panel shown in FIG. 7, the first protection film 36, the alignment film 37' for the retardation layer, and the second protection film 40 are laminated in this order above the black matrix 35. Accordingly, the adhering force is weak at the boundary between the first protection film 36 and the alignment film 37' for the retardation layer and at the boundary between the alignment film 37' for the retardation layer and the second protection layer 40 to lower the sealing reliability for the seal portion.

On the contrary, in the liquid crystal panel of this embodiment shown in FIG. 3, the first protection film 36 and the second protection film 40 are laminated in this order above the black matrix 35. That is, the layer boundary of poor adhesion between the alignment film 37 for the retardation layer and the protection film is not present at a portion of disposing the sealing material 710. Accordingly the seal portion is firmly sealed compared with the liquid crystal panel shown in FIG. 7.

That is, poor adhesion at the layer boundary between the polyimide type polymer (alignment film for the retardation layer) and the acrylic polymer, an epoxy type polymer, or an acrylic polymer and epoxy type mixed polymer (protection film) causes lowering of the strength of the liquid crystal panel having the in-cell retarder. Accordingly, the panel strength is improved by forming the structure not having the layer structure of poor adhesion. As described above, problems occurred so far in the layer structure for the portion of disposing the sealant of the color filter having the in-cell retarder at the portion between each of the layers of the leveling film 36, the alignment film 37' for the retardation layer, and the protection layer 40 for the retardation layer. In this embodiment, by forming the structure of removing the intermediate polyimide type polymer at least from a portion where the sealing material is disposed, the protection layer 40 for the retardation layer is directly laminated above the leveling film 36. Since the leveling film 36 and the protection layer 40 for the retardation layer are made of an identical type polymer, their solubility parameters are close to each other and adhesion between the layers is improved compared with the existent structure. Even when not all of the alignment film 37 for the retardation layer is removed from the region on the main surface of the first substrate 31 (portion opposing to the sealing material 710) where the sealing member 710 is disposed, adhesion of the seal structure is improved so long as a portion thereof is removed compared with that of the existent structure. That is, a portion of the alignment film 37 for the retardation layer may be left in the region so long as the film does not completely cover the region on the main surface of the first substrate 31.

One embodiment of the present invention has been described above.

In this embodiment, descriptions have been made about the panel structure and the manufacturing process for the IPS system transflective liquid crystal panel having the in-cell retarder. However, the invention is not restricted thereto and can also be used in the transflective liquid crystal panel having the in-cell retarder of the VA system or other liquid crystal driving system. In this case, the TFT structure, the pixel structure of the color filter, the retardation value of the retardation layer and other panel constitution are different depending on the liquid crystal driving system, but the effect of the invention can be provided by removing the alignment film for the retardation layer from the layer structure corresponding to the position of disposing the sealing material.

Further, in this embodiment, the polyimide type polymer is used as the alignment film 37 for the retardation layer and the acrylic and epoxy type mixed type polymer is used for the leveling film (first protection film) 36 and the protection layer for the retardation layer (second protection film) 40. However, they are not restrictive but the effect of the invention can be provided irrespective of the type of the materials to be used so long as adhesion is weak between the alignment film 37 for the retardation layer and the leveling film 36 or between the alignment film 37 for the retardation layer and the protection layer 40 for the retardation layer, and adhesion is strong between the leveling layer 36 and the protection layer 40 for the retardation layer.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device having liquid crystals put between a first substrate and a second substrate, and having a reflective display section for conducing display by a reflection light and a transmissive display section for conducting display by a transmission light, wherein
   a first protection layer, an alignment film for a retardation layer, a retardation layer, and a second protection layer are laminated in this order at a position corresponding to the reflective display section of the first substrate, and
   a seal portion at an outer peripheral edge of a display region has a region where the first protection layer and the second protection layer are laminated in this order, and
   an outer edge of the alignment film for the retardation layer is disposed inside of the seal portion.

2. A liquid crystal display device having liquid crystals put between a first substrate and a second substrate, and having a reflective display section for conducing display by a reflection light and a transmissive display section for conducting display by a transmission light, wherein
   a retardation layer is formed to the first substrate at a position corresponding to the reflective display section at the surface on the side of the liquid crystal, and
   an outer edge of an alignment film for the retardation layer is disposed to the first substrate inside of a seal portion provided at the outer peripheral edge of the display region at the surface on the side of the liquid crystals.

3. The liquid crystal display device according to claim 1, wherein
the material for forming the retardation layer contains an additive for adjusting the wettability.

4. The liquid crystal display device according to claim 3, wherein
the additive is one of acrylic additives, silicon type additives, and fluoric additives.

5. The liquid crystal display device according to claim 3, wherein
the content of the additive is 0.2% by weight or less based on the material for forming the retardation layer.

6. The liquid crystal display device according to claim 1, wherein
the material for forming the retardation layer contains an Si element.

7. A method of manufacturing a liquid crystal display device having a liquid crystal layer sandwiched in a opposing gap between a first substrate and a second substrate, in which the first substrate and the second substrate are sealed at an outer peripheral edge of the display region by a sealing material, the display region includes a matrix arrangement of a plurality of pixels, and having a reflective display section and a transmissive display section on every pixel,
the method comprising the steps of:
forming an alignment film for a retardation layer to the main surface of the first substrate in the surface of the substrate other than at a position where at least a part of the sealing material is disposed,
providing the alignment film for the retardation layer with an alignment control function,
applying an optical retardation material covering the alignment film for retardation layer, and
selectively exposing and curing a portion of the optical retardation material corresponding to the reflective display section.

8. The manufacturing method of a liquid crystal display device according to claim 7, wherein
the material for forming the retardation layer contains an additive for adjusting the wettability.

9. The manufacturing method of a liquid crystal display device according to claim 7, wherein
the additive is one of acrylic additives, silicon type additive, and fluoric additives.

10. The manufacturing method of a liquid crystal display device according to claim 8, wherein the content of the additive is 0.2% by weight or less based on the solidifying ingredient of the optical retardation material.

11. The manufacturing method of a liquid crystal display device according to claim 7, wherein the step of applying the optical retardation material includes the use of an optical retardation material adjusted for the wettability such that the content angle to a test specimen with a contact angle of 65° or more is 20° or less when it is brought into contact with a droplet of pure water with a specific resistivity of 10 MΩcm or higher and measuring the contact angle after 30 sec.

12. A color filter substrate of a liquid crystal display device having a reflective display section and a transmissive display section wherein
a first protection layer, an alignment film for a retardation layer, a retardation layer, and a second protection layer are laminated in this order at a position corresponding to the reflective display section at the main surface on the liquid crystal side of the color filter substrate,
a region of stacking the first protection layer and the second protection layer in this order is present at a position corresponding to a seal portion at an outer peripheral edge of a display region, and
an outer edge of the alignment film for the retardation layer is disposed inside of the seal portion.

13. A color filter substrate of a liquid crystal display device having a reflective display section and a transmissive display section, wherein
a retardation layer is formed at a position corresponding to the reflective display section at a surface on the side of the liquid crystal, and
an outer edge of an alignment film for the retardation layer is disposed inside of a seal portion provided at an outer peripheral edge of the display region at the surface on the side of the liquid crystal.

* * * * *